(12) United States Patent
Nakao et al.

(10) Patent No.: US 7,390,050 B2
(45) Date of Patent: Jun. 24, 2008

(54) BELT MOLDING

(75) Inventors: Makoto Nakao, Chiryu (JP); Tomohiro Taguchi, Kariya (JP); Yoshimune Shimada, Toyota (JP)

(73) Assignees: Aisin Seiko Kabushiki Kaisha, Kariya-shi, Aichi-ken (JP); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 11/790,311

(22) Filed: Apr. 25, 2007

(65) Prior Publication Data

US 2007/0278827 A1 Dec. 6, 2007

(30) Foreign Application Priority Data

Apr. 27, 2006 (JP) .............................. 2006-123677

(51) Int. Cl.
*E06B 7/16* (2006.01)
(52) U.S. Cl. ...................... 296/146.1; 296/146.2; 49/502
(58) Field of Classification Search .............. 296/146.1, 296/146.2; 49/502
See application file for complete search history.

(56) References Cited

U.S. PATENT DOCUMENTS 6,966,601 B2 * 11/2005 Matsumoto et al. ...... 296/146.2

FOREIGN PATENT DOCUMENTS

| JP | 2001-97137 | 10/1994 |
|---|---|---|
| JP | 1997-328017 | 12/1997 |

* cited by examiner

Primary Examiner—Joseph D Pape
(74) Attorney, Agent, or Firm—Finnegan, Henderson, Farabow, Garrett & Dunner, LLP

(57) ABSTRACT

A belt molding includes an elongated molding body mounted along a clearance portion between a frame member and a panel member of a vehicle, a first acting portion provided at the molding body and configured to push the frame member, and a second acting portion provided at the molding body and configured to engage with the panel member. The second acting portion is elastically formed in order to establish an engaged state where the second acting portion is engaged with the panel member and a disengaged state where the second acting portion is disengaged from the panel member. The second acting portion includes a pressing portion which is configured to be pushed towards the frame member along the panel member by an external device inserted between the panel member and the molding body to change the engaged state to the disengaged state.

4 Claims, 4 Drawing Sheets

BELT MOLDING

CROSS REFERENCE TO RELATED APPLICATIONS

This application is based on and claims priority under 35 U.S.C. §119 with respect to Japanese Patent Application No. 2006-123677 filed on Apr. 27, 2006, the entire content of which is incorporated herein by reference.

FIELD OF THE INVENTION

The present invention relates to a belt molding.

BACKGROUND

Molding members such as a belt molding, a window molding, and a side protection molding, or the like, are provided at a vehicle along a clearance such as a long groove. For example, a long groove, which opens for a window configured to go up and down at a door, is provided with a resin made belt molding which is elongated and shaped approximately in C form in cross section. The following arts disclose how to mount the belt molding onto the vehicle.

For example, a belt molding described in JP2001-97137A is mounted onto a frame body using a screw which is inserted from a side of a frame member.

A belt molding described in JPH09-328017A is mounted onto a frame body by engaging a protruding portion provided at a cap, which is fitted to an end portion of the belt molding, with a hole formed on a frame member so that the protruding portion serves as an attaching means.

According to the construction described in JP2001-97137A, in which the belt molding is mounted onto the frame member by means of a screw, complex assembling process is required using tools.

According to the construction described in JPH09-328017A, the belt molding can be readily assembled to the vehicle because the belt molding can be assembled only by engaging the protruding portion with the hole formed on the frame member after inserting the belt molding into the clearance from a top of the clearance. The protruding portion engaging with the hole of the frame member serves as a stopper of the belt molding so that the belt molding does not readily detach after assembling. On the other hand, when removing the belt molding, because it is difficult to operate an engaged portion of the protruding portion and the hole from outside, the protruding portion may break by forcibly disengaging the protruding portion from the hole. When the protruding portion breaks, the belt molding cannot be reused.

A need thus exists for a belt molding which can be readily attached to and detached from a clearance portion.

SUMMARY OF THE INVENTION

In light of the foregoing, the present invention provides a belt molding, which includes an elongated molding body mounted along a clearance portion between a frame member and a panel member of a vehicle, a first acting portion provided at the molding body and configured to push the frame member, and a second acting portion provided at the molding body and configured to engage with the panel member. The second acting portion is elastically formed in order to establish an engaged state where the second acting portion is engaged with the panel member and a disengaged state where the second acting portion is disengaged from the panel member. The second acting portion includes a pressing portion which is configured to be pushed towards the frame member along the panel member by an external means inserted between the panel member and the molding body to change the engaged state to the disengaged state.

According to the embodiment of the present invention, because the second acting portion is configured to be elastically moved relative to the panel member, the belt molding can be readily mounted onto the clearance portion by inserting the belt molding into the clearance portion in the attaching direction to engage with the panel member.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
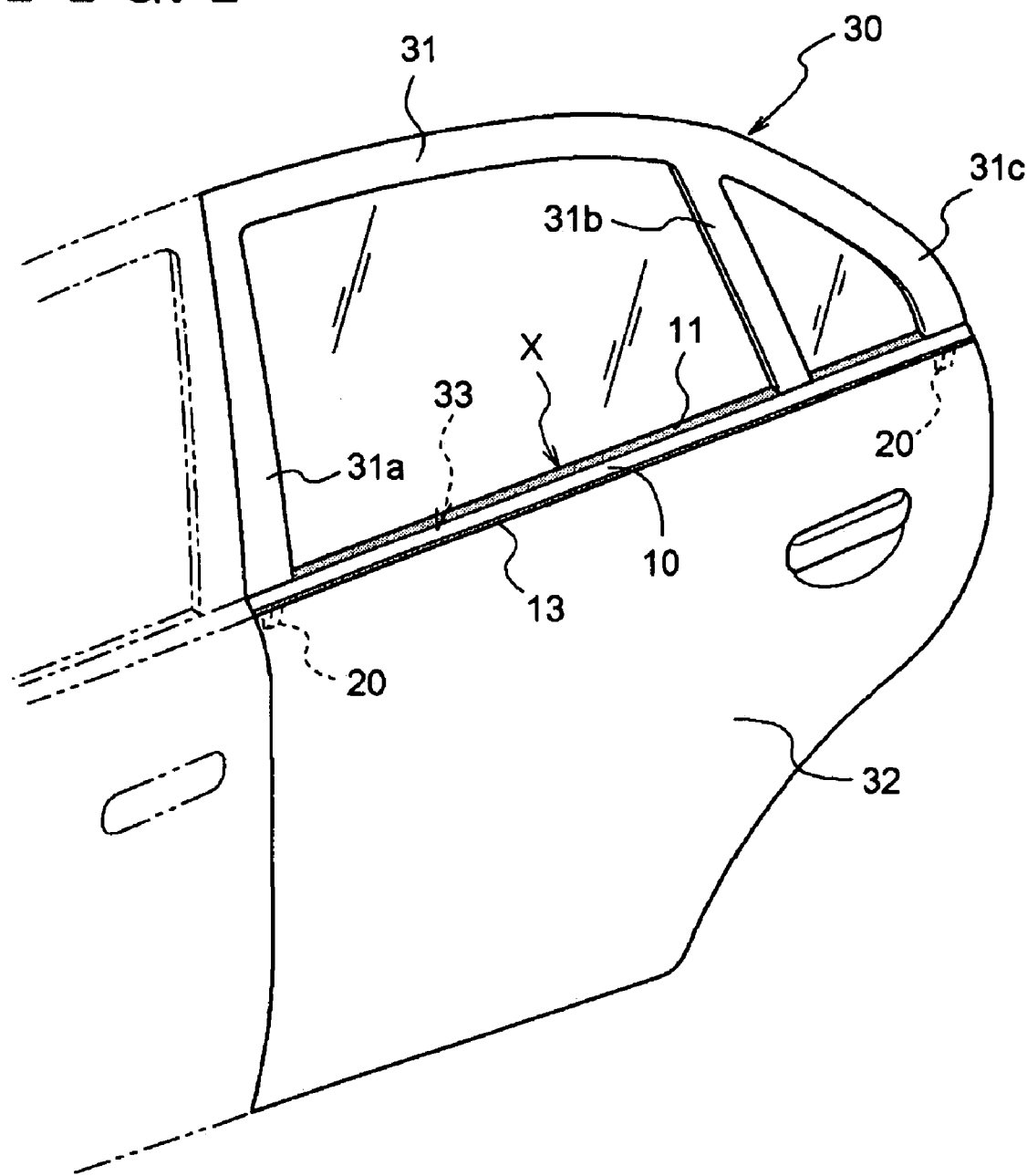
FIG. 1 is a perspective view when a belt molding is mounted onto a vehicle according to an embodiment of the present invention.

One embodiment of the present invention will be explained with reference to illustrations of drawing figures as follows.

A construction of a belt molding X will be explained with reference to FIGS. 1-6. The belt molding X is mounted onto a vehicle along a clearance portion 33 which is formed between a door frame 31 (i.e., serving as a frame member) and a door panel 32 (i.e., serving as a panel member) when assembled.

The belt molding X includes an elongated molding body 10 and an attaching means 20 which is attached to the molding body 10 and is inserted into the clearance portion 33 so that the attaching means 20 is attached between the door frame 31 and the door panel 32.

The molding body 10 is, for example, made of resin and is shaped approximately in a C form in cross-section. The molding body 10 is provided between doorframes 31a-31c. The molding body 10 includes a draining portion 11 along a longitudinal direction, which prevents water drops attached on a windowpane from leaking into the clearance portion 33 in response to a lowering of the windowpane provided at a door 30. In those circumstances, the draining portion 11 is not formed at portions where the molding body 10 and the doorframe 31 are arranged opposing to each other.

The molding body 10 includes a shock absorbing portion 12 which absorbs a shock applied to the door frame 31 and a shock absorbing portion 13 which absorbs a shock applied to the door panel 32. The shock absorbing portions 12, 13 are, for example, made of rubber which is readily deformed.

Figure 2:
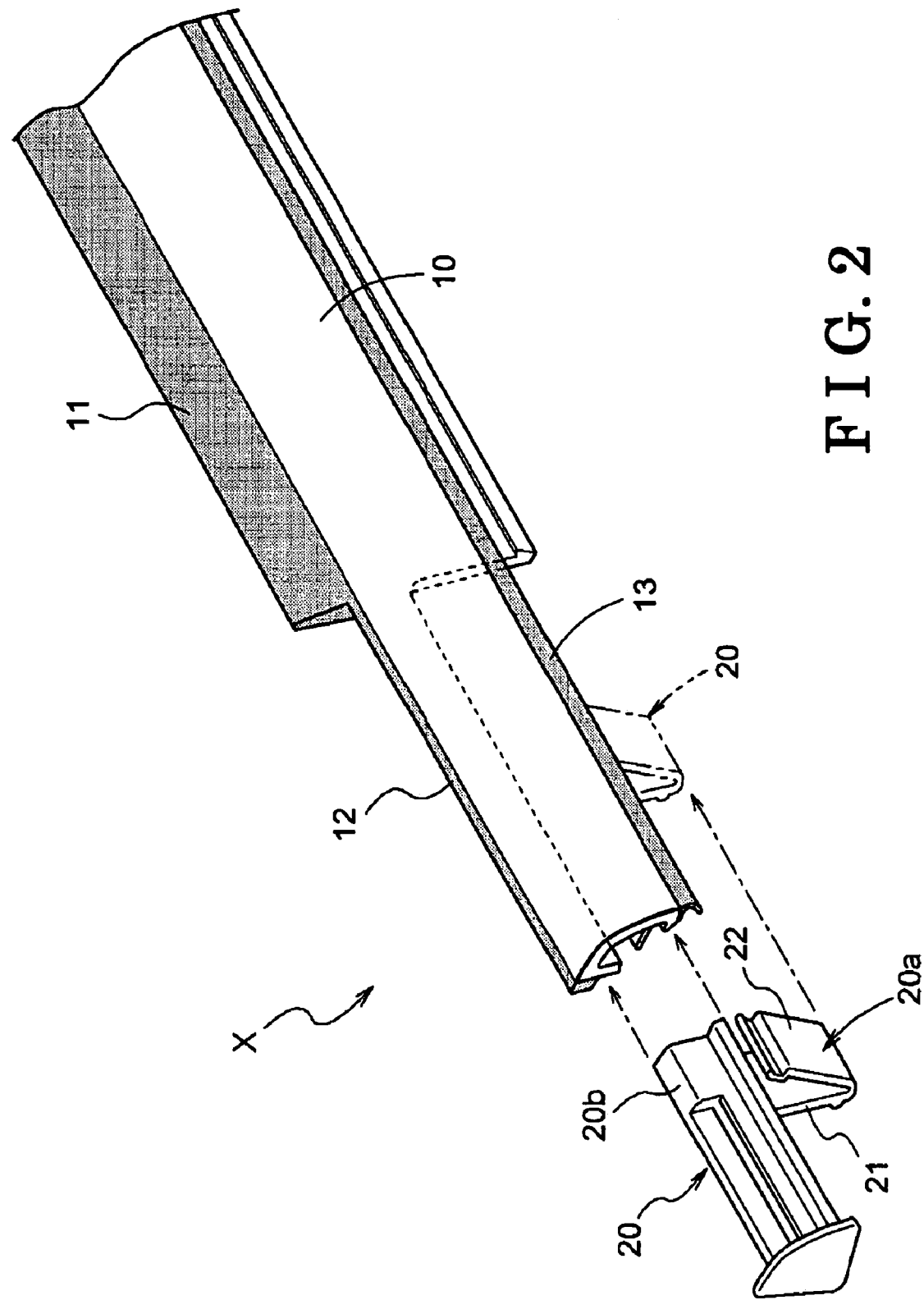
FIG. 2 is a partial perspective view of the belt molding according to the embodiment of the present invention.

As shown in FIG. 2, the attaching means 20 is configured to be assembled to the molding body 10 by fitting an assembling portion 20b to an end portion of the molding body 10. According to the embodiment of the present invention, the attaching means 20 is provided at the both end portions of the molding body 10. The number of the attaching means 20 is not limited and may be varied.

The attaching means 20 includes a first acting portion (i.e., a doorframe pressing portion) 21 which acts on the doorframe 31 and a second acting portion (i.e., a door panel engagement portion) 22 which acts on the door panel 32. According to the embodiment of the present invention, the first acting portion 21 serves as a door frame pressing portion which is positioned to push against the door frame 31 and the second acting portion 22 serves as a door panel engagement portion which is configured to be engageable with a tip end portion of the door panel 32. Alternatively, the first acting portion 21 may act on the doorframe 31 by configuring the first acting portion 21 to engage with an engagement groove formed on the doorframe 31.

The attaching means 20 is elastically bent so that the door panel engagement portion (i.e., the second acting portion) 22 can be elastically moved (i.e., the door panel engagement portion 22 is elastically formed) so as to achieve an engaged state (shown in FIG. 3) where the door panel engagement portion 22 engages with the door panel 32 and a disengaged state (shown in FIG. 4) where the door panel engagement portion 22 is disengaged from the door panel 32. The attaching means 20 includes a guide portion 20a including the door panel engagement portion 22, which is elastically bent to be inserted into the clearance portion 33. For example, the guide portion 20a is tapered to be thinner at a tip end in an attaching direction. According to the embodiment of the present invention, the attaching means 20 is likely to be inserted into an accurate position in the clearance portion 33.

The door panel engagement portion 22 includes a first contact portion 22a which comes in contact with a backside 32b of the door panel 32, and a second contact portion 22b which comes in contact with a rim portion 32a of the door panel 32 in a direction along the door panel 32 (See FIGS. 3-6). In those circumstances, the second contact portion 22b comes in contact with the rim portion 32a, for example, in a longitudinal direction of the clearance portion 33.

Upon insertion of the guide portion 20a into the clearance portion 33 so that the rim portion 32a of the door panel 32 come in contact with the guide portion 20a from the initial state (shown in FIG. 5) where the guide portion 20a is not inserted into the clearance portion 33, the door panel engagement portion 22 is elastically leaned towards the door frame 31. In those circumstances, because the belt molding X is in contact with the doorframe 31 and the door panel 32 but is not engaged therewith, for example, the engagement position of the belt molding X can be adjusted along in a longitudinal direction of the clearance portion 33.

Figure 3:
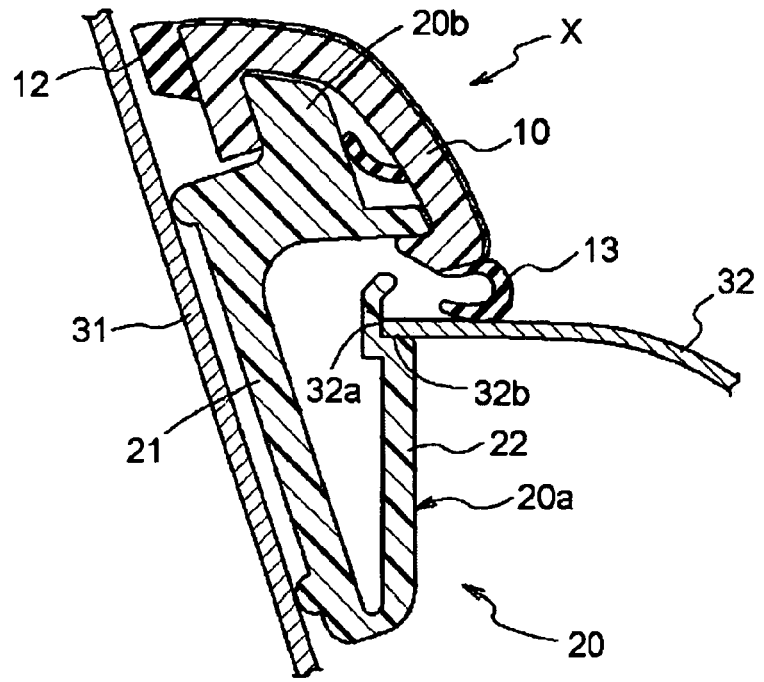
FIG. 3 is a cross-sectional view of the belt molding under an engaged state according to the embodiment of the present invention.

When the rim portion 32a of the door panel 32 reaches the first contact portion 22a by further inserting the guide portion 20a in an attaching direction, the backside 32b of the door panel 32 and the first contact portion 22a contact each other to establish the engaged state (shown in FIG. 3).

Because the attaching means 20 is configured to elastically bent to move the door panel engagement portion 22 relative to the door panel 32, the belt molding X can be readily mounted to cover the clearance portion 33 by inserting the belt molding X into the clearance portion 33 in the attaching direction to engage with the door panel 32.

When the first contact portion 22a and the backside 32b of the door panel 32 come in contact with each other, the door panel 32 and the door panel engagement portion 22 are engaged. According to the embodiment of the present invention, as shown in FIG. 3, further, the second contact portion 22b and the rim portion 32a of the door panel 32 come in contact with each other. In those circumstances, the second contact portion 22b receives a reaction force which pushes towards the door frame 31 from the rim portion 32a, and thus the door panel engagement portion 22 is pushed towards the door frame 31. Accordingly, the doorframe-pressing portion 21 is pushed towards the doorframe 31 via the door panel engagement portion 22 so that the doorframe pressing portion 21 and the doorframe 31 are securely fixed.

The engaged state is established at least when the first contact portion 22a and the backside 32b of the door panel 32 contact each other. Upon the contact of the first contact portion 22a of the attaching means 20 and the backside 32b of the door panel 32, the reaction force of the shock absorbing portion 13 affects the contact portion of the first contact portion 22a and the backside 32b to maintain the engaged state. Because the molding body 10 has rigidity, even at portions of the molding body 10 on which the attaching means 20 is not provided, the molding body 10 is held at stable attitude between the door panel 32 and the window. Therefore, at least when the first contact portion 22a and the backside 32b of the door panel 32 contact each other, the engaged state of the attaching means 20 and the molding body 10 can be maintained.

In the engaged state, even when the door panel engagement portion 22 and the rim portion 32a which is a tip end portion of the door panel 32 do not come in contact with each other because of the manufacturing inaccuracy, the engaged state can be securely maintained by the engagement of the first contact portion 22a and the backside 32b of the door panel 32.

Figure 4:
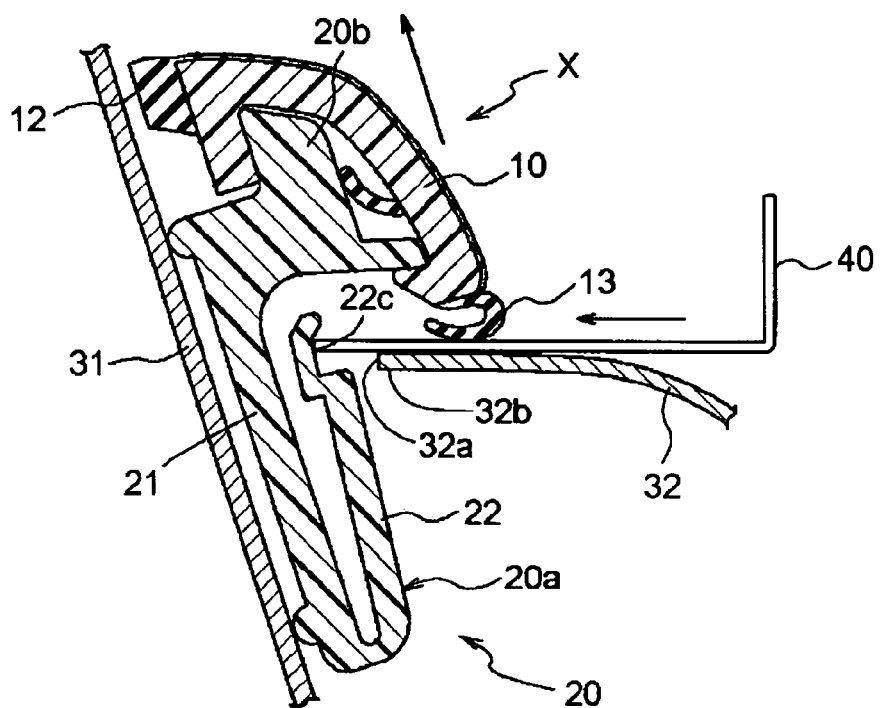
FIG. 4 is a cross-sectional view of the belt molding under a disengaged state according to the embodiment of the present invention.
Figure 5:
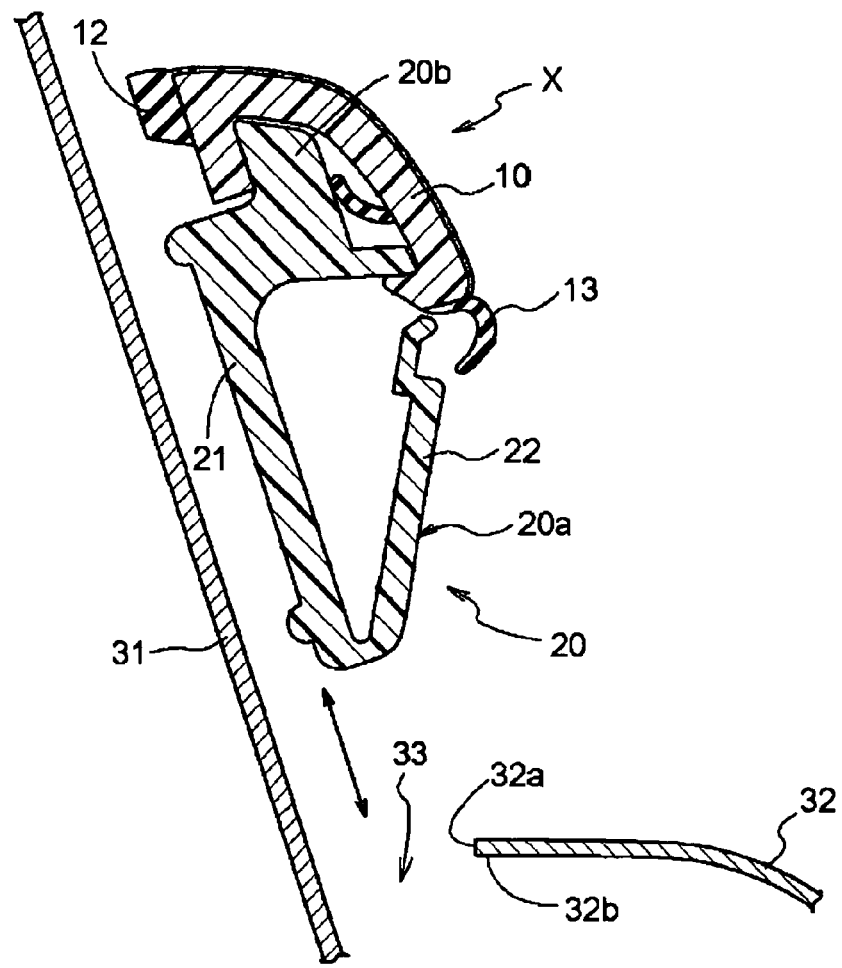
FIG. 5 is a cross-sectional view of the belt molding under an initial state according to the embodiment of the present invention.

The door panel engagement portion 22 includes a pressing portion 22c which is configured to be pushed towards the door frame 31 along an external surface of the door panel 32 by means of a tool 40 penetrating between the door panel 32 and the shock absorbing portion 13 (molding body 10) in order to change the engaged state to the disengaged state (shown in FIG. 4).

Any type of tool, for example, plane shaped member, can be applied as the tool 40 as long as the tool can penetrate between the door panel 32 and the shock absorbing portion 13 (the molding body 10). As shown in FIGS. 3, 4, the clearance between the door panel 32 and the molding body 10 is covered with the shock absorbing portion 13. However, because the shock absorbing portion 13 is readily deformable, the tool 40 can penetrate between the door panel 32 and the molding body 10 by thrusting itself through or lifting the shock absorbing portion 13.

The tool 40 is pushed into the clearance between the door panel 32 and the molding body 10 and comes in contact with the pressing portion 22c. When the pressing portion 22c is pushed towards the door frame 31 along the door panel 32 by means of the tool 40 in a state where the contact of the tool 40 to the pressure portion 22c is maintained, the door panel engagement potion 22 and the door panel 32 are disengaged to establish the disengaged state (shown in FIG. 4).

By moving the belt molding X in a reverse direction from the attaching direction in the disengaged state, the belt molding X can be removed. In those circumstances, because the door panel engagement portion 22 and the door panel 32 are in a disengaged state, the door panel engagement potion 22 will not be damaged. Accordingly, because the belt molding X which is removed from the clearance portion 33 can be mounted onto the clearance portion 33 again, the belt molding X can be reused.

Figure 6:
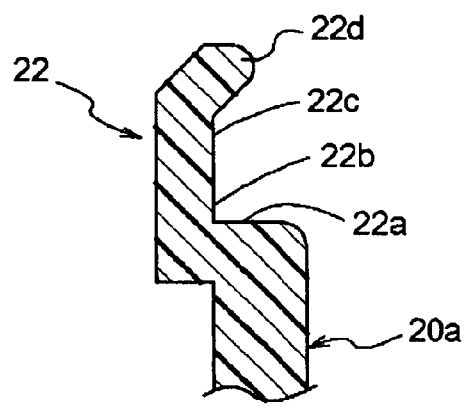
FIG. 6 is a cross-sectional view of a door panel engagement portion (second acting portion) according to the embodiment of the present invention.

The pressing portion 22c includes a pressing state maintaining portion 22d which protrudes from the door panel engagement portion 22 towards the door panel 32 (shown in FIG. 6). The pressing state maintaining portion 22d is configured so that the tool 40 is not removed from the pressing portion 22c until the door panel engagement portion 22 is disengaged. Because the contact state of the tool 40 and the pressing portion 22c is likely to be maintained by the pressing state maintaining portion 22d even when the entering direction of the tool 40 is inconsistent, the tool 40 can securely push the pressing portion 22c.

The embodiment of the present invention can be applied to the belt molding which includes the elongated molding body mounted along the clearance portion between the frame member and the panel member which are parts of the vehicle, and the molding body includes the first acting portion which acts on the frame member and the second acting portion which acts on the panel member.

According to the embodiment of the present invention, because the second acting portion is configured to be elastically bent relative to the panel member, the belt molding can be readily mounted onto the clearance portion by inserting the belt molding into the clearance portion in the attaching direction to engage with the panel member.

On the other hand, when removing the belt molding from the clearance portion, by pushing the pressing portion towards the frame member along the panel member, the engagement state of the second acting portion and the panel member is released to establish the disengaged state. By simply moving the belt molding in the reverse direction from the attaching direction, the belt molding can be readily removed from the clearance portion. In those circumstances, the second acting portion will not be damaged because the second acting portion and the panel member have been disengaged. Accordingly, the belt molding which is once removed from the clearance portion can be readily remounted onto the clearance portion.

According to the embodiment of the present invention, when the first contact portion and the backside of the panel member come in contact with each other, the panel member and the second acting portion are engaged. Further, when the second contact portion and the rim portion of the panel member come in contact with each other, the second contact portion receives the reaction force from the rim portion of the panel member to push towards the frame member, and thus the second acting portion is pushed towards the frame member. Consequently, the first acting portion is pushed towards the frame member via the second acting portion, and the first acting portion and the frame member are securely fixed.

According to the embodiment of the present invention, for example, when the pressing portion is pushed by means of a tool, the pressed state is maintained by the pressing state maintaining portion even if the pushing direction is not consistent. Accordingly, the pressing portion can be securely pushed to readily remove the belt molding.

The principles, preferred embodiment and mode of operation of the present invention have been described in the foregoing specification. However, the invention which is intended to be protected is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A belt molding comprising:
an elongated molding body mounted along a clearance portion between a frame member and a panel member of a vehicle;
a first acting portion provided at the molding body and configured to push the frame member; and
a second acting portion provided at the molding body and configured to engage with the panel member, the second acting portion elastically formed in order to establish an engaged state where the second acting portion is engaged with the panel member and a disengaged state where the second acting portion is disengaged from the panel member; wherein the second acting portion includes a pressing portion which is configured to be pushed towards the frame member along the panel member by an external means inserted between the panel member and the molding body to change the engaged state to the disengaged state.

2. The belt molding according to claim 1, wherein the second acting portion includes a first contact portion which is configured to contact with a backside of the panel member and a second contact portion which is configured to contact with a rim portion of the panel member in a direction along the panel member.

3. The belt molding according to claim 1, wherein the pressing portion includes a pressing state maintaining portion which protrudes from the second acting portion towards the panel member.

4. The belt molding according to claim 2, wherein the pressing portion includes a pressing state maintaining portion which protrudes from the second acting portion towards the panel member.

* * * * *